United States Patent
Dhamankar et al.

(10) Patent No.: US 7,680,472 B2
(45) Date of Patent: Mar. 16, 2010

(54) DEVICE AND METHOD FOR RECEIVING AND PROCESSING RF SIGNALS, A METHOD FOR PROVIDING DIGITAL CALIBRATION VALUES FOR SUCH A DEVICE AND A RECEIVER INCORPORATING THE DEVICE

(75) Inventors: Sudhind Dhamankar, Plano, TX (US); Naveen K. Yanduru, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 460 days.

(21) Appl. No.: 11/766,530

(22) Filed: Jun. 21, 2007

(65) Prior Publication Data

US 2008/0318537 A1  Dec. 25, 2008

(51) Int. Cl.
  H04B 1/18  (2006.01)
  H04B 17/00  (2006.01)
(52) U.S. Cl. .............. 455/193.1; 455/67.11; 455/226.1
(58) Field of Classification Search .............. 455/193.1, 455/193.2, 130, 150.1, 226.1, 67.11
See application file for complete search history.

(56) References Cited

U.S. PATENT DOCUMENTS

| | | | |
|---|---|---|---|
| 6,424,824 B1 * | 7/2002 | Stepp et al. | 455/197.3 |
| 6,778,023 B2 * | 8/2004 | Christensen | 331/16 |
| 6,940,358 B1 * | 9/2005 | Meacham | 331/117 R |
| 7,480,349 B2 * | 1/2009 | Beamish et al. | 375/324 |
| 7,526,265 B2 * | 4/2009 | Beamish et al. | 455/284 |

* cited by examiner

*Primary Examiner*—Sonny Trinh
(74) *Attorney, Agent, or Firm*—Ronald O. Neerings; Wade James Brady, III; Frederick J. Telecky, Jr.

(57) ABSTRACT

A device for receiving a RF signal over multiple channels, a receiver incorporating the device, a method of providing digital calibration values for a digitally-tunable resonant circuit of the device, and a method of processing an RF signal. In one embodiment the device includes: (1) a low-noise amplifier having a digitally-tunable resonant circuit, (2) a memory configured to store digital calibration values particular to the device and (3) a time-constant controller coupled to the low-noise amplifier and configured to retrieve from the memory at least one of the digital calibration values as a function of a channel to be received and, based on the at least one, to cause the digitally-tunable resonant circuit to provide a time-constant corresponding to the channel to be received.

22 Claims, 4 Drawing Sheets

DEVICE AND METHOD FOR RECEIVING AND PROCESSING RF SIGNALS, A METHOD FOR PROVIDING DIGITAL CALIBRATION VALUES FOR SUCH A DEVICE AND A RECEIVER INCORPORATING THE DEVICE

TECHNICAL FIELD OF THE INVENTION

The invention is directed, in general, to a RF receiving device and, more specifically, to a digitally-tunable resonance circuit associated with a Low Noise Amplifier (LNA) of an RF receiving device.

BACKGROUND OF THE INVENTION

At the point at which an antenna receives it, a radio frequency (RF) signal is not only typically far too weak to be processed, but also contains unwanted "blockers." Blockers are artifacts that superpose and interfere with the received signal and include noise from external sources and perhaps near-end crosstalk (NEXT) from simultaneous transmissions from the transceiver itself. The receive chain of the transceiver is therefore provided with an LNA and a resonant circuit to reduce the artifacts and amplify the received signal before processing occurs.

The goal of a well-designed LNA and resonant circuit is to amplify the received signal and reject the blockers. This is known as "discrimination." Effective discrimination is beneficial for transceivers of all kinds, including Global System for Mobile communication (GSM) compliant transceivers. However, it is essential for transceivers that transmit and receive concurrently, such as Universal Mobile Telecommunications System (UMTS) compliant transceivers. Unfortunately, achieving effective discrimination in the latter context is particularly challenging, since the blockers potentially include both noise and NEXT.

If the LNA and the resonant circuit provide effective discrimination, performance requirements for additional circuitry downstream in the receive chain (e.g., the mixer) can be relaxed. For example, the linearity, or dynamic range, requirement of the mixer can be reduced without compromising the transceiver's operation. As a result, the downstream circuitry can be less expensive, lowering the overall cost of the transceiver.

The resonant circuit takes the form of an inductance-capacitance (LC) circuit in which the inductance is in parallel with the capacitance and is tuned to resonate at a particular frequency, e.g., the center frequency of a particular channel. Unfortunately, manufacturing variations and defects often result in LC circuits that do not resonate at their intended frequencies. Even small variations in resonant frequency can move the resonant circuit off-channel and drastically degrade discrimination.

The capacitance values of integrated circuit (IC) based LC circuits do not vary continuously; instead, they vary by quantized (digital) amounts. The least-significant bit (LSB) of the digital number representing the capacitance value (known as a "capacitor code") thus is the smallest capacitance value by which an LC circuit can be changed. For example, a change in the capacitance LSB can move the resonant frequency of an LC circuit off the target center frequency by 2-5 MHz, depending on the center frequency value and the resolution of the capacitance LSB. Extremes in manufacturing process variations, sometimes called "process corners," may result in a capacitor code several codes away from a required capacitor code. An error of more than 2-3 codes can result in unacceptable discrimination and require, for example, a higher linearity range in the mixer.

Accordingly, what is needed in the art is a device and method that improves receive chain discrimination.

SUMMARY OF THE INVENTION

To address the above-discussed deficiencies of the prior art, the invention provides a device for receiving a RF signal over multiple channels. In one embodiment the device includes: (1) a low-noise amplifier having a digitally-tunable resonant circuit, (2) a memory configured to store digital calibration values particular to the device and (3) a time-constant controller coupled to the low-noise amplifier and configured to retrieve from the memory at least one of the digital calibration values as a function of a channel to be received and, based on the at least one, to cause the digitally-tunable resonant circuit to provide a time-constant corresponding to the channel to be received.

In another aspect the invention provides a method of providing digital calibration values for a digitally-tunable resonant circuit associated with an LNA on a RF receiving device. In one embodiment the method includes: (1) applying a signal at a known frequency of a channel to an input of the LNA, (2) computing a Fast Fourier Transform (FFT) peak value for the known frequency from an FFT engine on the RF receiving device, (3) determining a time-constant of the digitally-tunable resonant circuit which resulted in the FFT peak value and (4) storing in the RF receiving device a digital calibration value representing the time-constant wherein the digital calibration value is accessible during operation thereof.

In still another aspect, the invention provides a method of processing a received RF signal. In one embodiment, the method of processing includes: (1) determining a channel selected on a device to receive the RF signal, (2) retrieving digital calibrating values from a memory on the device that are associated with the channel and dependent on the device, (3) calculating a time-constant based on the digital calibrating values and (4) directing a digitally-tunable resonant circuit to provide the time-constant.

In yet still another aspect, the invention provides a receiver. In one embodiment the receiver includes: (1) an antenna configured to receive RF signals via multiple programmable channels, (2) a device, coupled to the antenna and configured to process a signal received thereby via a programmed channel. The device includes: (2A) a low-noise amplifier having a digitally-tunable resonant circuit, (2B) a mixer coupled to the low-noise amplifier and configured to down-convert the signal, (2C) a memory configured to store digital calibration values particular to the device and (2D) a time-constant controller coupled to the low-noise amplifier and configured to retrieve from the memory at least one of the digital calibration values as a function of the programmed channel and, based thereon, to cause the digitally-tunable resonant circuit to provide a time-constant corresponding to the programmed channel.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
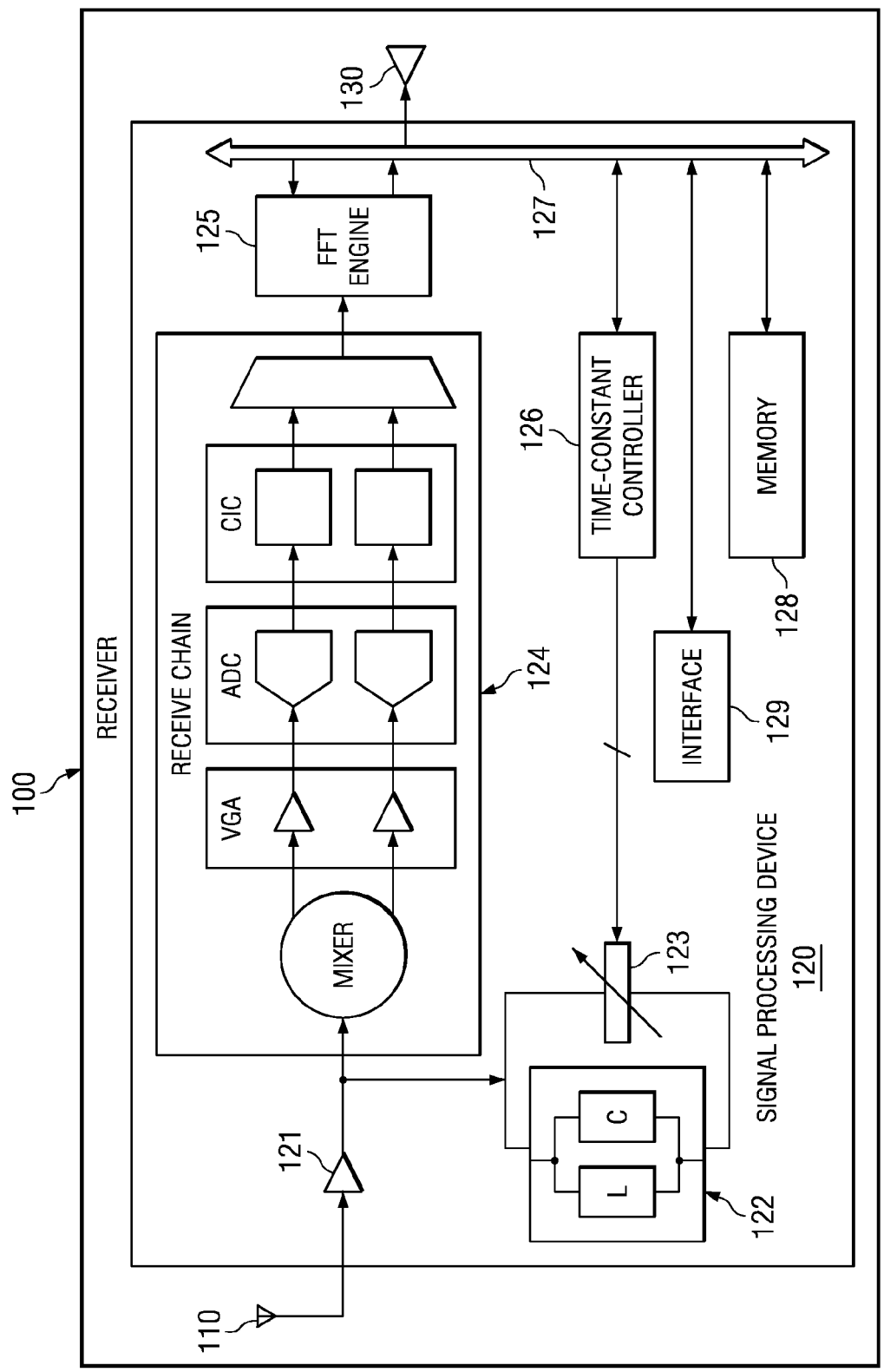
FIG. 1 illustrates a block diagram of an embodiment of a receiver constructed according to the principles of the invention.

FIG. 1 illustrates a block diagram of an embodiment of a receiver, generally designated 100, constructed according to the principles of the invention. The receiver 100 is a radio frequency (RF) receiver that includes an antenna 110, a signal processing signal processing device 120 and a user interface 130. Of course, one skilled in the art will understand that the receiver 100 includes additional components or circuitry that are not illustrated or discussed but are typically included therein. For example, the receiver 100, may be a mobile telephone that also includes a keypad, a display, a microphone, a memory, a controller, etc. In some embodiments, the receiver 100 may be a mobile telephone configured to operate in a Universal Mobile Telecommunications System (UMTS) environment. In other embodiments, the receiver 100 may be a mobile telephone configured to operate in other communications networks, such as a Global System for Mobile communication (GSM) environment.

The antenna 110 is configured to receive RF signals via multiple programmable channels. The antenna 110 may be a conventional antenna typically employed in mobile telephones. As such, the antenna 110 may send and receive RF signals through a cellular communications network. Thus, the channels that receive the RF signals can be programmed automatically by the receiver 100 as the receiver travels through various communications cells. Additionally, the receiver may switch channels automatically due to interference. The receiver 100 may include a control that allows a user to manually switch channels.

Coupled to the antenna 110 is the signal processing device 120. The signal processing device 120 is configured to process a signal received by the antenna 110. The signal processing device 120 may be a chip. A chip is defined as a piece of semi conducting material (typically small) on which an integrated circuit is embedded.

The signal processing device 120 includes a low noise amplifier 121, a resonant circuit 122, a digitally-tunable resonant circuit 123, a receive chain 124, a Fast Fourier Transform (FFT) engine 125, a time-constant controller 126, an interface bus 127, a memory 128 and a time-constant controller interface 129.

The LNA 121 amplifies the signals received by the antenna 110. The LNA 121 may be a conventional LNA commonly employed in RF receivers such as a mobile telephone. Typically, the RF signals received by the antenna 110 are weak and need amplification for processing by the receive chain 124. To insure the signal is amplified and noise is rejected, the LNA 121 employs a resonant circuit to tune out the noise and amplify the receive signal. The LNA 121 cooperates with the resonant circuit 122 and the digitally-tunable resonant circuit 123 to provide the proper rejection and amplification. In FIG. 1, the resonant circuit 122 is a conventional LC resonant circuit having a fixed inductance and capacitance. The value of the inductance and capacitance are determined depending on the frequencies of the signals received by the receiver 100. The digitally-tunable resonant circuit 123 cooperates with the resonant circuit 122 to obtain the desired resonance for a selected frequency. In different embodiments, the digitally-tunable resonant circuit 123 can be a variable capacitance or a variable inductance.

The receive chain 124 processes signals received by the antenna 110. The receive chain 124 includes components typically included in conventional receive chains of a RF receiver. The receive chain 124 includes a mixer, variable gain amplifiers (VGA), analog to digital converters (ADC), cascaded integrator-comb (CIC) filters and a multiplexer. The mixer down converts the signal amplified by the LNA 121 into I and Q components that are amplified, converted to digitals signals, filtered and combined by the mixer, the VGA, the ADC, the CIC filters and the multiplexer of the receive chain 124, respectively. One skilled in the art will understand the operation and configuration of the receive chain 124. One skilled in the art will also understand that other receive chains may be used with the invention.

The FFT engine 125 receives the processed digital signal from the receive chain 124 and computes the FFT measurement for the processed digital signal. The FFT engine 125 may employ a Goertzel FFT scheme to obtain the FFT measurement at a single point. After obtaining the FFT measurement, the FFT engine 125 obtains the magnitude of the FFT by calculating the square root of the square of real and imaginary values of FFT measurement. The magnitude of the FFT measurement represents the magnitude of the tone at the CIC filter output. During operation of the receiver 100, the FFT magnitude is further processed (not illustrated) to determine the data from the signal received by the antenna 110. After the data is determined, the data is then provided to the user interface 130. The user interface 130, for example, may be a speaker (as illustrated) or a visual display. During calibration, the FFT magnitude is used to determine the time-constants and the associated digital calibration values.

As noted above, the resonant circuit 122 and the digitally-tunable resonant circuit 123 are employed with the LNA 121 to amplify the received signal and filter (reject) noise. During design of the receiver 100, the size and configuration of the resonant circuit 122 is determined to provide the proper amplification and filtering for specific frequency channels. The manufactured resonant circuit 122, however, may not perform as designed. This may be due to, for example, manufacturing errors. The digitally-tunable resonant circuit 123, therefore, can compensate for lack of performance of the resonant circuit 122 by, for example, compensating for manufacturing errors or other abnormalities, to insure proper amplification and filtering.

The time-constant controller 126 is configured to direct the digitally-tunable resonant circuit 123 to provide the proper resonance for amplification and filtering. The time-constant controller 126 is a conventional script processor and register having a sequence of operating instructions that represents an algorithm for calculating a time-constant based on digital calibrating values stored in the memory 128. The sequence of operating instructions in the time-constant controller 126 is modifiable. The instructions may be upgraded via the time-constant controller interface 129. In some embodiments, the time-constant may represent a capacitance value. In other embodiments, the time-constant may represent an inductance value.

The memory 128 is coupled to the time-constant controller 126 through the interface bus 127 and is configured to store the digital calibration values. The memory 128 is a ROM. In some embodiments, the memory 128 may be a ROM with embedded electrical fuses, such as, an eFUSE ROM. Of course, in other embodiments, the memory 128 may be another type of memory or another ROM memory. The memory 128 can store other data in addition to the digital calibration values.

In some embodiments, a digital calibration value representing each of the frequencies of the receiver 100 is not stored. Instead, a pre-determined number of digital calibration values are stored to represent the range of frequencies of the receiver 100. The pre-determined number is based on a minimum number of values that are needed to calculate a time-constant for each frequency in the range of frequencies. In one embodiment, the minimum number of values is based on a sufficient number of values to establishing a linear relationship between digital calibration values that are stored. Thus, the time-constant controller 126 can calculate the time-constant for a frequency without a stored digital calibration value by interpolating between stored values. If a selected frequency has a stored digital calibration value, then the time-constant controller 126 can use that stored value to determine the time-constant.

The time-constant controller interface 129 is configured to provide access to the time-constant controller 126 via the interface bus. The time-constant controller interface 129 can be a conventional interface typically employed in a mobile telephone. The time-constant controller interface 129 can be used during calibration as discussed with reference to FIG. 3 and can be used thereafter for updating the instructions in the time-constant controller 126.

Figure 2:
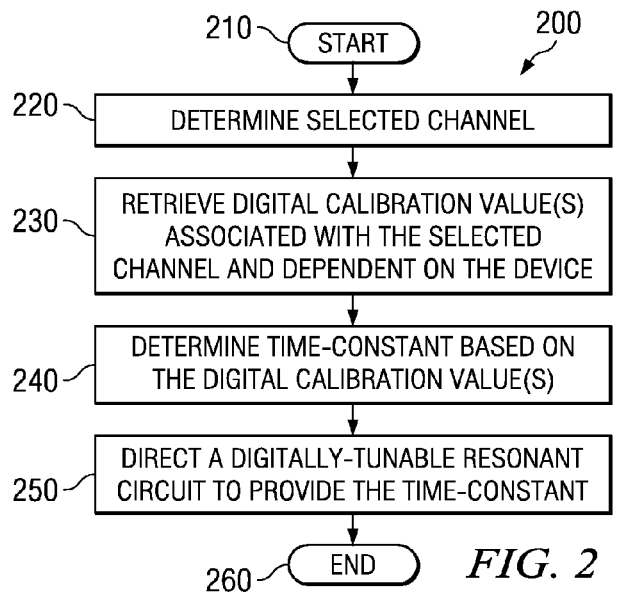
FIG. 2 illustrates a flow diagram of an embodiment of a method for processing an RF signal carried out according to the principles of the invention.

FIG. 2 illustrates a flow diagram of an embodiment of a method 200 for processing an RF signal carried out according to the principles of the invention. The method 200 begins in a step 210.

After starting, a channel selected on a device to receive the RF signal is determined in a step 220. The channel may be selected automatically by the device when roaming. The channel may also be selected automatically due to interference. In some embodiments, a user may select the channel.

After determining the selected channel, digital calibrating values are retrieved from a memory on the device that is associated with the selected channel and dependent on the device in a step 230. A time-constant controller may determine the selected channel. The digital calibrating values are values selected to represent frequency channels within a band. In some embodiments a single digital calibration value is retrieved.

A time-constant based on the digital calibrating values is then determined in a step 240. The digital calibrating values are a pre-determined set of values selected to represent frequency channels within a band. The pre-determined set may have fewer values than the channels in the band but a sufficient number of values to at least establish a linear relationship between stored values. If a specific digital calibrating value is not stored for the selected frequency channel, a time-constant controller may employ the digital calibration values to calculate the time-constant for the frequency channel by, for example, interpolating.

After calculating the time-constant, a digitally-tunable resonant circuit is directed to provide the time-constant in a step 250. The method 200 then ends in a step 260.

Figure 3:
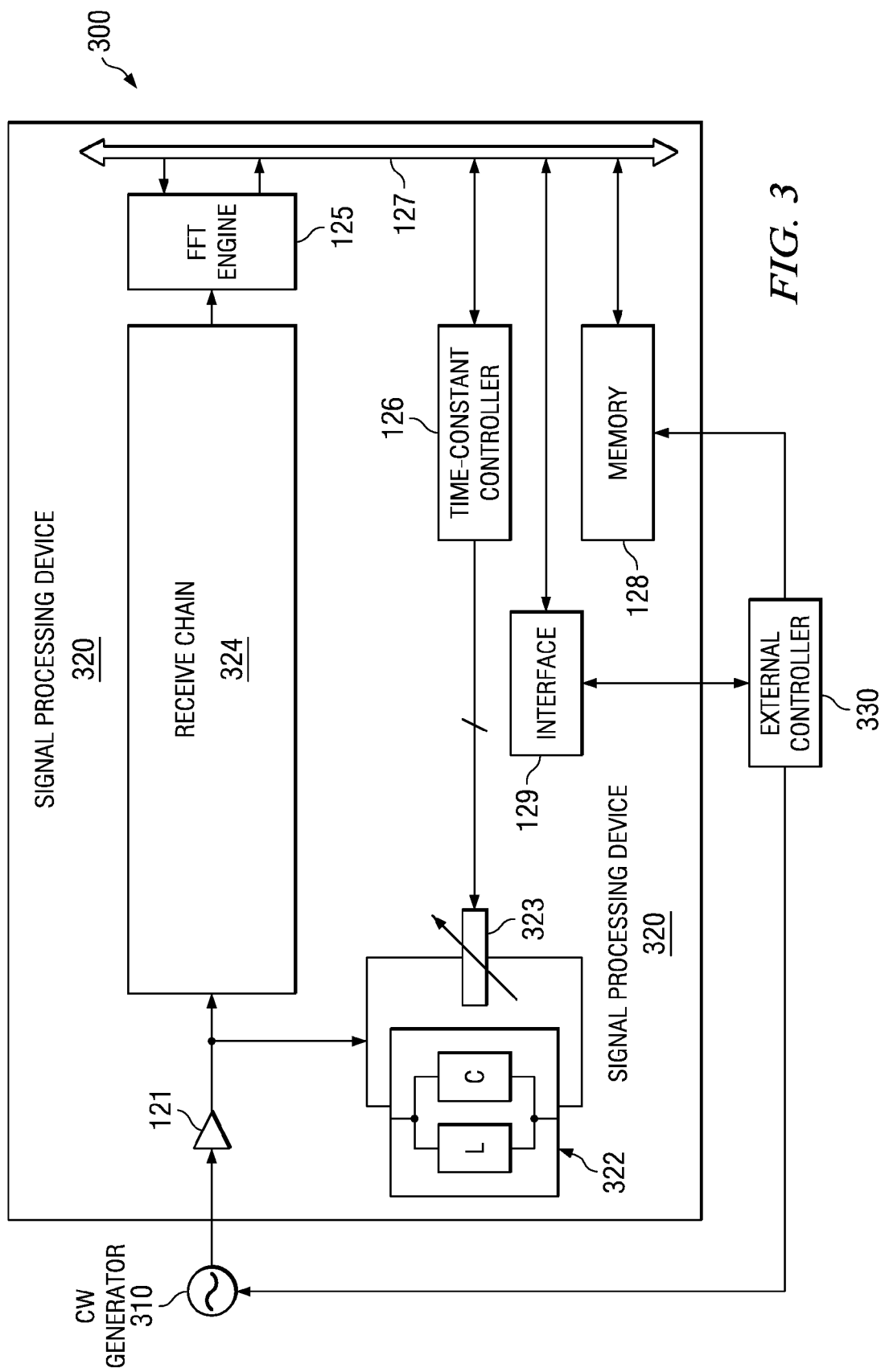
FIG. 3 illustrates a block diagram of an embodiment of a configuration employed to provide digital calibration values for a digitally-tunable resonant circuit associated with a low-noise amplifier (LNA) on a radio frequency (RF) receiving device according to the principles of the invention.

FIG. 3 illustrates a block diagram of an embodiment of a configuration employed to provide digital calibration values for a digitally-tunable resonant circuit associated with an LNA on a RF receiving device, signal processing device 320, according to the principles of the invention. The configuration 300 includes a continuous wave generator 310 and an external controller 330. The signal processing device 320 includes similarly labeled components as the signal processing device 120 of FIG. 1. Each of these components is configured and operates as discussed above. The receive chain 324 and the digitally-tunable resonant circuit 323 are labeled differently to indicate that another receive chain may be used and to indicate that the digitally-tunable resonant circuit 323 is a variable capacitance.

The continuous wave generator (CWG) 310 delivers a continuous wave signal to an input of the LNA 121. The frequency of the continuous wave signal is controlled by the external controller 330. The external controller 330 is also configured to store a sequence of operating instructions in the time-constant controller 126 that interact with the external controller 330 to direct the calibration process. The external controller 330 is also configured to interact with the time-constant controller 126 to store the digital calibration values in the memory 128 based on the frequency being applied by the CWG 310. The number of digital calibration values to be stored is determined by the time-constant controller 126. The CWG 310 may be a conventional CWG. The external controller 330 may be a conventional computer configured to interface with the CWG 310, the time-constant controller 126 through the interface 129, and the memory 128, by a sequence of operating instructions that directs its operation. In other embodiments, the external controller 330 may be a dedicated hardware device directed by instructions.

The digitally-tunable resonant circuit 323 provides a variable capacitance value. In one embodiment, the digitally-tunable resonant circuit 123 may be multiple units of capacitors that can be added together to obtained a desired capacitance value to achieve the desired resonance for the received frequency channel. The number of capacitors to add together is determined by the time-constant controller 126 during calibration. In some embodiments, the digitally-tunable resonant circuit 123 includes 255 capacitor units, each having a value of 27 fF, that may be added together as directed by the time-constant controller 126 to provide a capacitance range of substantially zero (0) to 6.885 pF. In such embodiments, the time-constant controller 126 may be coupled to the digitally-tunable resonant circuit 123 via an eight bit control bus.

Figure 4:
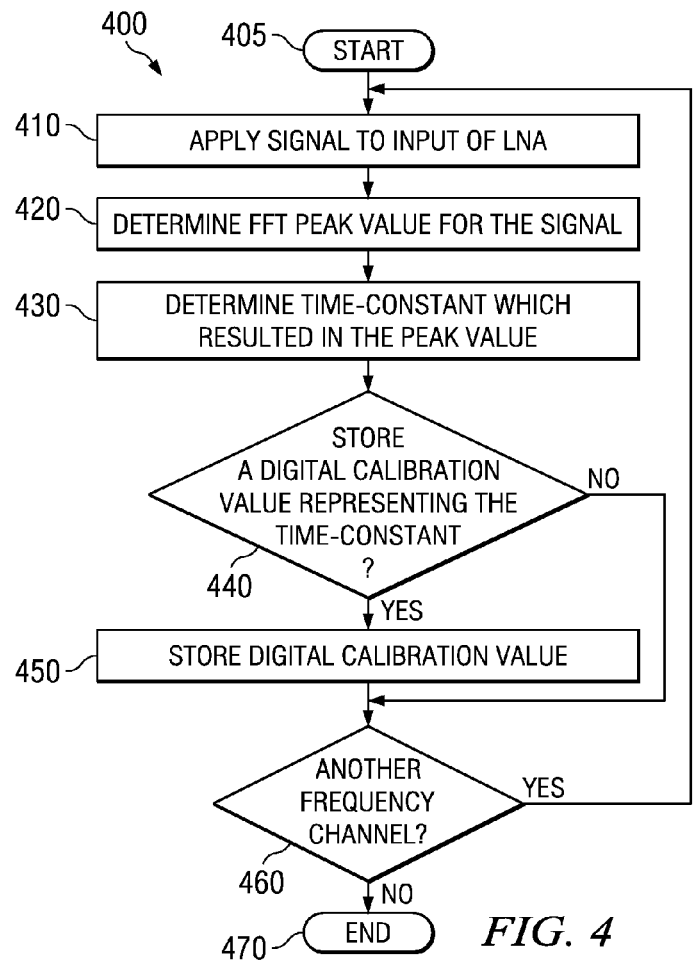
FIG. 4 illustrates a flow diagram of an embodiment of a method of providing digital calibration values for a digitally-tunable resonant circuit associated with an LNA on a RF receiving device carried out according to the principles of the invention.

FIG. 4 illustrates a flow diagram of an embodiment of a method 400 of providing digital calibration values for a digitally-tunable resonant circuit associated with an LNA on a RF receiving device carried out according to the principles of the invention. The method 400 begins in a step 405 with an intent to provide the digital calibration values.

After starting, a signal is applied at a known frequency of a channel to an input of the LNA in a step 410. The signal is a continuous wave signal and can be applied by a continuous wave generator.

After applying the known frequency, an FFT peak value is determined for the known frequency from an FFT engine on the RF receiving device in a step 420. The FFT peak value may be determined by changing the digitally-tunable resonant circuit while applying the signal at the known frequency and computing an FFT value until the FFT peak value is determined.

A time-constant of the digitally-tunable resonant circuit which resulted in the FFT peak value is then determined in a step 430. A time-constant controller of the RF receiving device may be used to determine the time-constant when the FFT peak value is obtained.

In a first decisional step 440, a determination is made if a digital calibration value representing the time-constant should be stored in the RF receiving device. The determination is based on a pre-determined set of values that are needed to calculate the time-constant during operation. The time-constant controller can make this determination. If the digital calibration value is needed, it is stored in the RF receiving device in a step 450 wherein the digital calibration value is accessible during operation thereof. If the digital calibration value does not need to be stored, the method 400 proceeds to a second decisional step 460.

In the second decisional step 460, a determination is made if there is another frequency channel to apply. There may be multiple frequency channels within a given band. Additionally, as noted below with respect to FIG. 5, there may be multiple bands associated with an RF receiving device. If there are additional frequency channels, then the method 400 returns to step 410 where a signal of another frequency channel is applied and the method 400 continues as described above. If there are no additional frequency channels needed, then the method 400 continues to a step 470 and ends.

Figure 5:
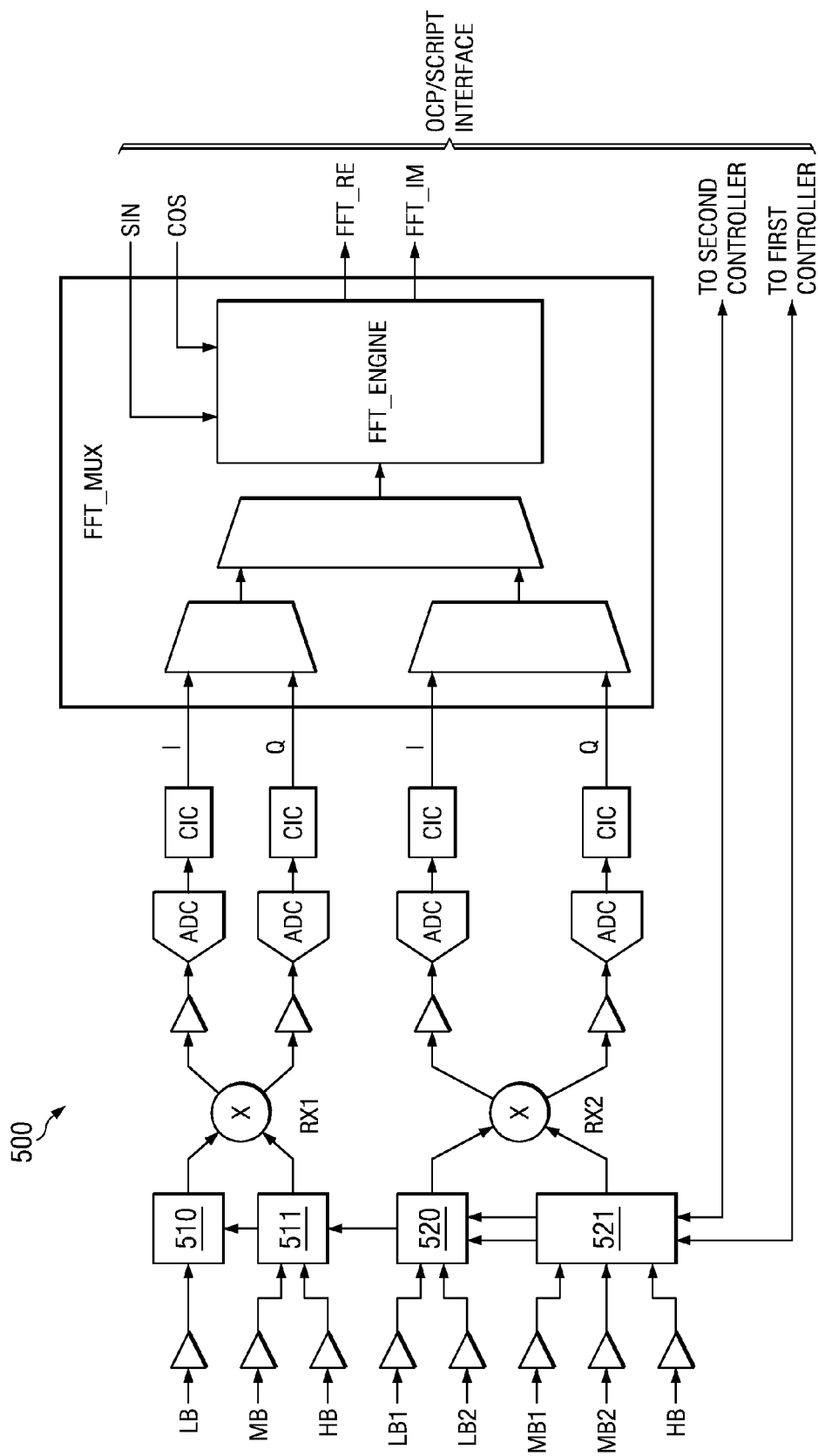
FIG. 5 illustrates a block diagram of an embodiment of a device having two receivers for receiving radio frequency (RF) signals constructed according to the principles of the invention.

FIG. 5 illustrates a block diagram of an embodiment of a device 500 having two receivers for receiving RF signals constructed according to the principles of the invention. The first receiver is configured to receive a low band, a midband and a high band. The second receiver is configured to receive a first and second low band, a first and second mid-band, and a single high band. Each of the bands of the first and second receivers have and an associated LNA. The first receiver and second receivers also have associated first and second LC resonant circuits, 510, 511, and 520, 521. The LC circuits 510, 511, 520, 521 include a fixed resonant circuit and digitally-tunable resonant circuit as discussed above with respect to FIGS. 1 and 3. The digitally-tunable resonant circuit has a variable capacitance. In other embodiments, the digitally-tunable resonant circuit may have a variable inductance. A first time-constant controller (not illustrated) is coupled to the LC resonant circuits 510, 511, and a second time-constant controller (not illustrated) is coupled to the resonant circuits 520, 521.

The first and second receivers also include a receive chain, RX1 and RX2, respectively, that functions as the receive chain 124 in FIG. 1. The 500 also includes an FFT Mux having a multiplexer coupled to each of the receive chains and a single FFT engine coupled thereto. The FFT engine is coupled to the interface bus (not illustrated).

Calibration and operation of the device 500 is similar to the calibration and operation as discussed with respect to FIGS. 1-4. As illustrated, however, the device 500 includes four LC resonant circuits with each having a digitally-tunable resonant circuit that needs to be calibrated for three different bands. Thus, there are a total of six times the calibration needs to be done for the LC resonant circuits 510, 511, 520, 521.

For calibration of the device 500, a continuous wave tone is applied to an input of the LNAs. The first and second time-constant controllers control estimation of an optimal tuning point after an FFT measurement has been completed for each frequency. After tuning, the first and second time-constant controllers control the generation of bit settings (digital calibration values) for the digitally-tunable resonant circuits. The 12 bit settings will be computed in the factory during calibration, loaded into memory (not illustrated) on the device 500 and retrieved from memory during operation per the receiving frequency of the device 500.

During calibration of the device 500, the optimal value for the time constant of the digitally-tunable resonant circuit is determined that results in the expected transmission rejection and also centers the LC resonant circuits as close to the center of a particular band as possible. The time-constant controllers are directed to finding the center frequency code for each band. The center of each band is given as per Table 1. The time-constant controllers in cooperation with an external controller will find the center of each band. A continuous wave tone with a sufficiently high power −40 dBm will be provided as the input to the LNAs at the center of each band.

TABLE 1

Table Showing Frequency Range/Center Frequencies/TX Offset of each band

| Band | Code | Low(MHz) | Center(MHz) | High(MHz) | TX Offset(MHz) |
|---|---|---|---|---|---|
| Low Band 1 | LB1 | 869 | 881.5 | 894 | 45 |
| Low Band 2 | LB2 | 925 | 942.5 | 960 | 45 |
| Mid Band 1 | MB1 | 1805 | 1842.5 | 1880 | 95 |
| Mid Band 2 | MB2 | 1930 | 1960.0 | 1990 | 80 |
| High Band | HB | 2110 | 2140.0 | 2170 | 190 |

The LC resonant circuits 510, 511, 521, 522, serve different bands as shown in Table 1 and FIG. 5. This section describes how the capacitor bits control the center frequency of the tank. Each LC resonant circuit includes an inductance in parallel to a capacitance. The inductance values depend on the band and the capacitance value is a variable capacitance that is used to control the center frequency of the LC resonant circuits. In this embodiment, the capacitance of the LC resonant circuits includes a fixed capacitance in parallel with a variable capacitance. The high band and mid band LC resonant circuits 511 and 521 will use eight digital calibration values. The low band LC resonant circuits 510 and 520 will typically use five to six digital calibration values that are the least significant bits from the same eight bit register (not illustrated) of the device 500 used by the LC resonant circuits 511, 521. For each receiver eight digital calibration values will be used for defining control of the digitally-tunable resonant circuit.

The fixed capacitance is substantially 2.97 pF. The variable capacitance can vary depending on the programmed code. The range for the variable capacitance is 0-255*27 fF 0-6.885 pF. In Table 2 below are the programming and values for each of the LC resonant circuits in all operating modes. The code values in Table 2 should result in the expected performance under the nominal conditions. During operation of the device, the time-constant controllers should return these code ranges for each of the LC resonant circuits for their respective bands. Based on simulations, code offsets of 1-2 code values will typically be acceptable to meet transmission rejection requirements.

TABLE 2

Ranges of codes for various tanks and their respective bands for Nominal Corner

| No. | Tank  | Band | L (nH) | C (pF) | Cvar Range (pf) | Code Range | Center Code |
|-----|-------|------|--------|--------|-----------------|------------|-------------|
| 1   | Tank1 | LB1  | 4.6    | 2.97   | 3.9585-4.1166   | 146-158    | 152         |
| 2   | Tank2 | MB2  | 1.1    | 2.97   | 2.8595-3.1961   | 105-118    | 112         |
| 3   | Tank2 | HB   | 1.1    | 2.97   | 1.9315-2.1901   | 71-81      | 76          |
| 4   | Tank3 | LB1  | 4.6    | 2.97   | 3.9585-4.1166   | 146-158    | 152         |
| 5   | Tank3 | LB2  | 4.6    | 2.97   | 3.0363-3.4311   | 112-127    | 119         |
| 6   | Tank4 | MB1  | 1.1    | 2.97   | 3.5626-4.0784   | 132-151    | 141         |
| 7   | Tank4 | MB2  | 1.1    | 2.97   | 2.8595-3.1961   | 105-118    | 112         |
| 8   | Tank4 | HB   | 1.1    | 2.97   | 1.9315-2.1901   | 71-81      | 76          |

The LC resonant circuits can be calibrated according to the following steps. These steps will be executed for every band for both receivers of the device 500. The steps will be executed a total of eight times for the LC resonant circuit 510 in LB, the LC resonant circuit 511 in MB and HB, the LC resonant circuit 520 in LB1, LB2 and the LC resonant circuit 521 in MB1, MB2 and HB. A base band equivalent frequency of the LNA input will be approximately around 100 KHz for GGE and around 1 MHz for a WCDMA mode.

First, the FFT Engine is programmed to compute the FFT for a length of 512 point FFT(GGE) or 1024 point FFT (WCDMA) and the sine and cosine coefficients for the expected base band location of the input tone to the LNA (if LO 1805 MHz and CW is at 1806 MHz then base band tone will be 1 MHz) The input frequency for the LNA is then set to center of the band+Offset (e.g. 1 MHz for WCDMA and 100 KHz for GGE) with a power of −40 dBm or more. Additionally, the digital calibration values are all set to zeros.

The FFT engine is then started and computes the FFT measurement at 1 MHz for WCDMA and 100 KHz for GGE. Once the FFT computation is completed, the magnitude of the FFT is determined by calculating the square root of the square of real and imaginary values of FFT output. The magnitude value is stored and the digital calibrating values are then reset to zero to again calculate the FFT magnitude with the digitally-tunable resonant circuit set at a maximum value. The two FFT magnitudes are compared and a binary search is performed for the magnitude using the digital calibrating values. The optimal value of the time-constant is determined where the maximum amplitude for the FFT is obtained via a binary search. The time-constant (i.e., a capacitor code in this embodiment) is then stored as the center code for the specific LC resonant circuit in that particular band. These steps are repeated for the other band and LC resonant circuits with the center frequencies as given in Table 1 and for the four LC resonant circuits 510, 511, 520, 521. For simulation, calibration may begin with the −20 code around center codes in Table 2 and go up to center code +20 to give a total of around 40 FFT computations. The code for which the Peak Value is obtained should be used as the code for the center of the band. One skilled in the art will understand that Tables 1 and 2 provide examples of values for FIG. 5 and that other values may be used for the illustrated architecture. Additionally, other architectures may be employed according to this invention.

Those skilled in the art to which the invention relates will appreciate that other and further additions, deletions, substitutions and modifications may be made to the described embodiments without departing from the scope of the invention.

What is claimed is:

1. A device for receiving a radio frequency (RF) signal over multiple channels, comprising:
    a low-noise amplifier having a digitally-tunable resonant circuit;
    a memory configured to store digital calibration values particular to said device; and
    a time-constant controller coupled to said low-noise amplifier and configured to retrieve from said memory at least one of said digital calibration values as a function of a channel to be received and, based on said at least one, to cause said digitally-tunable resonant circuit to provide a time-constant corresponding to said channel to be received.

2. The device as recited in claim 1 wherein said digitally-tunable resonant circuit is a digitally-tunable capacitance circuit.

3. The device as recited in claim 1 further comprising a FFT engine configured to determine said digital calibration values during factory calibration of said device.

4. The device as recited in claim 1 further comprising a fixed resonant circuit coupled to said digitally-tunable resonant circuit.

5. The device as recited in claim 1 wherein said digital calibration values are values for a pre-determined number of channels, said pre-determined number less than a total number of channels that are programmable by said device.

6. The device as recited in claim 1 wherein said time-constant controller causes said digitally-tunable resonant circuit to provide said time-constant according to a modifiable sequence of operating instructions.

7. The device as recited in claim 1 further comprising a second low-noise amplifier having a second digitally-tunable resonant circuit.

8. The device as recited in claim 1 wherein said channel to be received is one of said multiple channels and said time-constant controller is configured to cause said digitally-tunable resonant circuit to provide a time-constant corresponding to each of said multiple channels.

9. A method of providing digital calibration values for a digitally-tunable resonant circuit associated with a low-noise amplifier (LNA) on a radio frequency (RF) receiving device, comprising:
    applying a signal at a known frequency of a channel to an input of said LNA;
    computing an FFT peak value for said known frequency from an FFT engine on said RF receiving device;
    determining a time-constant of said digitally-tunable resonant circuit which resulted in said FFT peak value; and storing in said RF receiving device a digital calibration value representing said time-constant wherein said digital calibration value is accessible during operation thereof.

10. The method of claim 9 wherein said determining an FFT peak value includes changing said digitally-tunable resonant circuit while applying said signal at said known frequency and computing an FFT value until said FFT peak value is determined.

11. The method of claim 9 further comprising repeating said applying, said computing, said determining and said storing for multiple channels.

12. The method of claim 11 wherein a digital calibration value for each of said multiple channels is not stored.

13. A method for processing a radio frequency (RF) signal, comprising:
   determining a channel selected on a device to receive said RF signal;
   retrieving digital calibrating values from a memory on said device that are associated with said channel and dependent on said device;
   calculating a time-constant based on said digital calibrating values;
   and
   directing a digitally-tunable resonant circuit to provide said time-constant.

14. The method as recited in claim 13 wherein said digital calibrating values are a pre-determined set of values selected to represent channels within a band, said pre-determined set having less values than said channels in said band.

15. A receiver, comprising:
   an antenna configured to receive radio frequency (RF) signals via multiple programmable channels;
   a device, coupled to said antenna and configured to process a signal received by said antenna via a programmed channel, said device including:
   a low-noise amplifier having a digitally-tunable resonant circuit;
   a mixer coupled to said low-noise amplifier and configured to down-convert said signal;
   a memory configured to store digital calibration values particular to said device; and
   a time-constant controller coupled to said low-noise amplifier and configured to retrieve from said memory at least one of said digital calibration values as a function of said programmed channel and, based on said at least one, to cause said digitally-tunable resonant circuit to provide a time-constant corresponding to said programmed channel.

16. The receiver as recited in claim 15 wherein said digitally-tunable resonant circuit is a digitally-tunable capacitance circuit.

17. The receiver as recited in claim 15 wherein said device further comprises an FFT engine, said FFT engine employed during factory calibration of said device to determine said digital calibration values.

18. The receiver as recited in claim 15 wherein said device further comprises a fixed resonant circuit coupled to said digitally-tunable resonant circuit.

19. The receiver as recited in claim 15 wherein said digital calibration values are values for a pre-determined number of channels, said pre-determined number less than a total number of channels that are programmable by said receiver.

20. The receiver as recited in claim 15 wherein said time-constant controller causes said digitally-tunable resonant circuit to provide said time-constant according to a modifiable sequence of operating instructions.

21. The receiver as recited in claim 15 wherein said device further comprises a second low-noise amplifier having a second digitally-tunable resonant circuit.

22. The receiver as recited in claim 15 wherein said memory is a read only memory.

* * * * *